(12) United States Patent
Rappoport et al.

(10) Patent No.: US 9,552,169 B2
(45) Date of Patent: Jan. 24, 2017

(54) APPARATUS AND METHOD FOR EFFICIENT MEMORY RENAMING PREDICTION USING VIRTUAL REGISTERS

(71) Applicant: INTEL CORPORATION, Santa Clara, CA (US)

(72) Inventors: Lihu Rappoport, Haifa (IL); Jared W. Stark, Portland, OR (US); Kamil Garifullin, Moscow (RU); Franck Sala, Haifa (IL); Pavel I. Kryukov, Moscow (RU); Stanislav Shwartsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/706,936

(22) Filed: May 7, 2015

(65) Prior Publication Data

US 2016/0328172 A1 Nov. 10, 2016

(51) Int. Cl.
*G06F 3/06* (2006.01)
*G06F 12/08* (2016.01)

(52) U.S. Cl.
CPC ........... *G06F 3/0631* (2013.01); *G06F 3/0604* (2013.01); *G06F 3/0671* (2013.01); *G06F 12/0802* (2013.01); *G06F 2212/60* (2013.01)

(58) Field of Classification Search
CPC .... G06F 3/0631; G06F 3/0604; G06F 3/0671; G06F 12/0802; G06F 9/38; G06F 9/383–9/384
See application file for complete search history.

(56) References Cited

U.S. PATENT DOCUMENTS 6,505,293 B1 * 1/2003 Jourdan ............. G06F 9/30032
 712/216
6,625,723 B1 * 9/2003 Jourday ............... G06F 9/3824
 712/216

(Continued)

OTHER PUBLICATIONS

John Kubiatowicz. Explicit Renaming Prediction. Feb. 18, 2009. Available at: http://people.eecs.berkeley.edu~kubitron/courses/cs252-S09/lectures/lec08-prediction.pdf.*

(Continued)

*Primary Examiner* — Ryan Bertram
(74) *Attorney, Agent, or Firm* — Nicholson De Vos Webster & Elliott LLP

(57) ABSTRACT

A method and apparatus are described for efficient memory renaming prediction using virtual registers. For example, one embodiment of an apparatus comprises: a memory execution unit (MEU) to perform store and load operations to store data to memory and load data from memory, respectively; a plurality of memory rename (MRN) registers assigned to store and load operations, each MRN register to store data associated with a store operation so that the data is available for a subsequent load operation; and at least one MRN predictor comprising a data structure to allocate virtual memory rename (VMRN) registers to each of the MRN registers, the MRN predictor to query the data structure in response to a load and/or store operation using a value identifying the MRN register assigned to the load and/or store operation, respectively, to determine a current VMRN register associated with the load and/or store operation.

26 Claims, 13 Drawing Sheets

| MITE-MRN PREDICTOR 806 ||||||||
|---|---|---|---|---|---|---|---|
| Load Table 900 |||| Store Table 910 ||||
| Valid 901 | MRNi 902 | VMRNi 903 | Confidence Ctr. 904 | Valid 911 | MRNi 912 | VMRNi 913 ||
| 0 | 1 | 3 | 0 | 1 | 1 | 3 ||
| 1 | 2 | 4 | 2 | 0 | 3 | 6 ||
| 1 | 3 | 6 | 0 | 1 | 4 | 4 ||

(56) References Cited

U.S. PATENT DOCUMENTS

| | | | |
|---|---|---|---|
| 2003/0217251 A1* | 11/2003 | Jourdan | G06F 9/3834 |
| | | | 712/225 |
| 2008/0177984 A1* | 7/2008 | Lataille | G06F 9/30043 |
| | | | 712/220 |
| 2011/0208918 A1 | 8/2011 | Raikin et al. | |
| 2014/0095814 A1 | 4/2014 | Marden et al. | |

OTHER PUBLICATIONS

Intel Corporation, IA-32 Intel® Architecture Software Developer's Manual—vol. 2: Instruction 2003 Set Reference, 978 pages.

* cited by examiner

MITE-MRN PREDICTOR 806

Load Table 900

| Valid 901 | MRNi 902 | VMRNi 903 | Confidence Ctr. 904 |
|---|---|---|---|
| 0 | 1 | 3 | 0 |
| 1 | 2 | 4 | 2 |
| 1 | 3 | 6 | 0 |
| --- | --- | --- | --- |

Store Table 910

| Valid 911 | MRNi 912 | VMRNi 913 |
|---|---|---|
| 1 | 1 | 3 |
| 0 | 3 | 6 |
| 1 | 4 | 4 |
| --- | --- | --- |

FIG. 9

| IDQ-MRN PREDICTOR 814 | | |
|---|---|---|
| Extended IDQ Entries | | |
| Valid 1001 | MRNi 1002 | Conf. Ctr. 1003 |
| 1 | 1 | 0 |
| 0 | 2 | 3 |
| 1 | 3 | 1 |
| --- | --- | --- |

FIG. 10

APPARATUS AND METHOD FOR EFFICIENT MEMORY RENAMING PREDICTION USING VIRTUAL REGISTERS

BACKGROUND

Field of the Invention

This invention relates generally to the field of computer processors and software. More particularly, the invention relates to an apparatus and method for efficient register reclamation.

Description of the Related Art

Because the latency of accessing a register for reading/writing is usually less than one cycle, the register in a way is the fastest unit of the memory hierarchy. Typically, the "logical" registers, i.e., the registers exposed by the semantics of the instruction set architecture (ISA), are used by the compiler as sources/destinations for operands as well as for holding temporaries. However, prior to execution of this code on the hardware, the logical registers (LRegs) are mapped to a set of physical registers (PRegs) by a process called Register Allocation (RA).

Once the lifetime of the logical register is completed, i.e., there are no more consumers of the value held in the logical register prior to another value being stored in it, the logical-to-physical register mapping is torn down and the physical register is made available for allocation to another logical register. This process is called Register Reclamation (RR). Register mapping is typically held in a hardware table called the Register Allocation Table (RAT). The un-availability of free physical registers (i.e., physical registers not currently mapped to a logical register) causes all instruction allocation to stall until such a time that a free physical register is available, thereby reducing the performance.

BRIEF DESCRIPTION OF THE DRAWINGS

A better understanding of the present invention can be obtained from the following detailed description in conjunction with the following drawings, in which:

FIG. 9 illustrates macroinstruction translation engine (MITE) memory rename (MRN) predictor in accordance with one embodiment of the invention;

FIG. 10 illustrates an instruction decode queue (IDQ) predictor in accordance with one embodiment of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
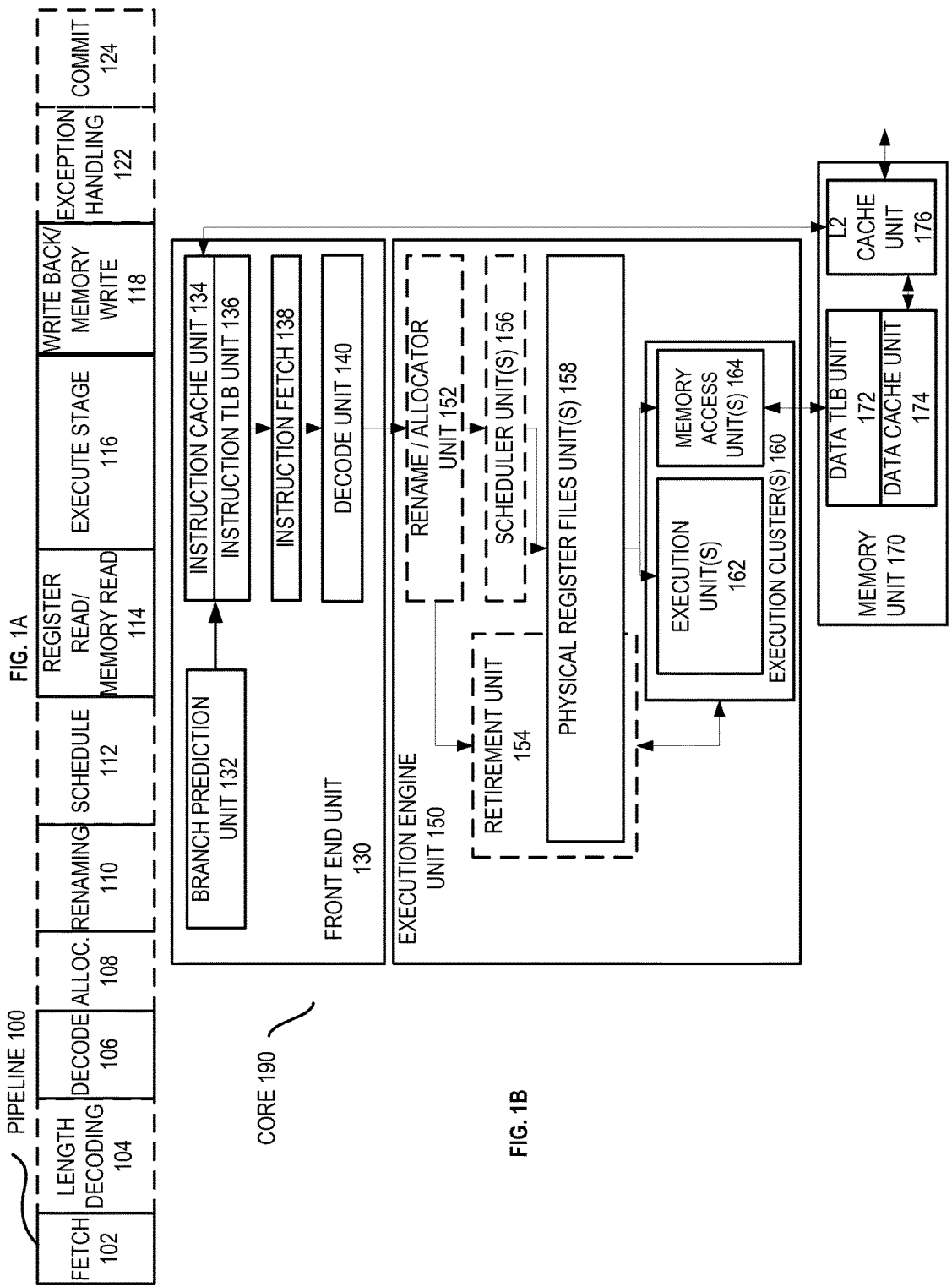
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
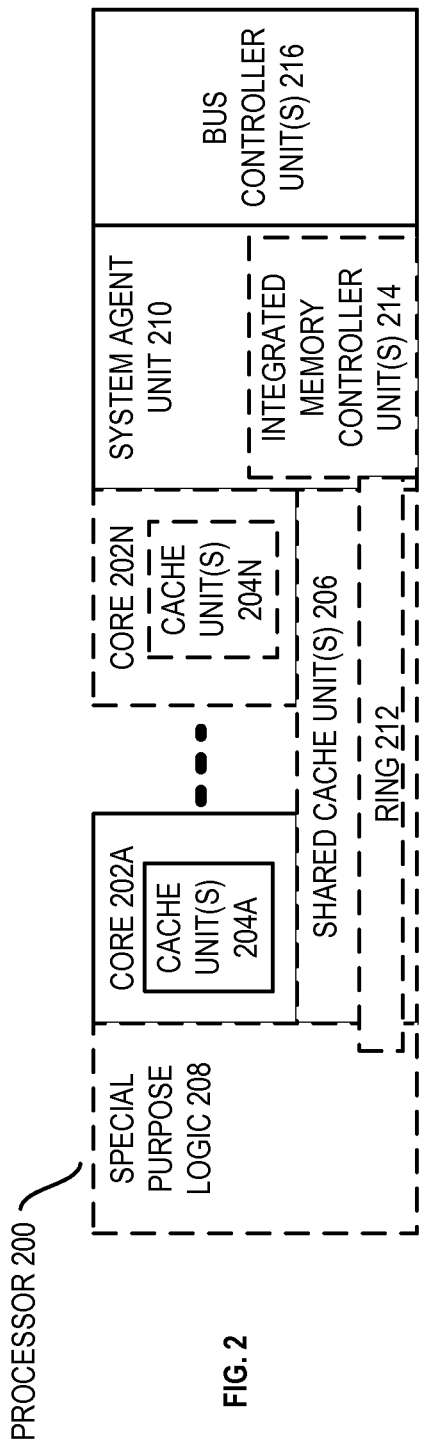
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
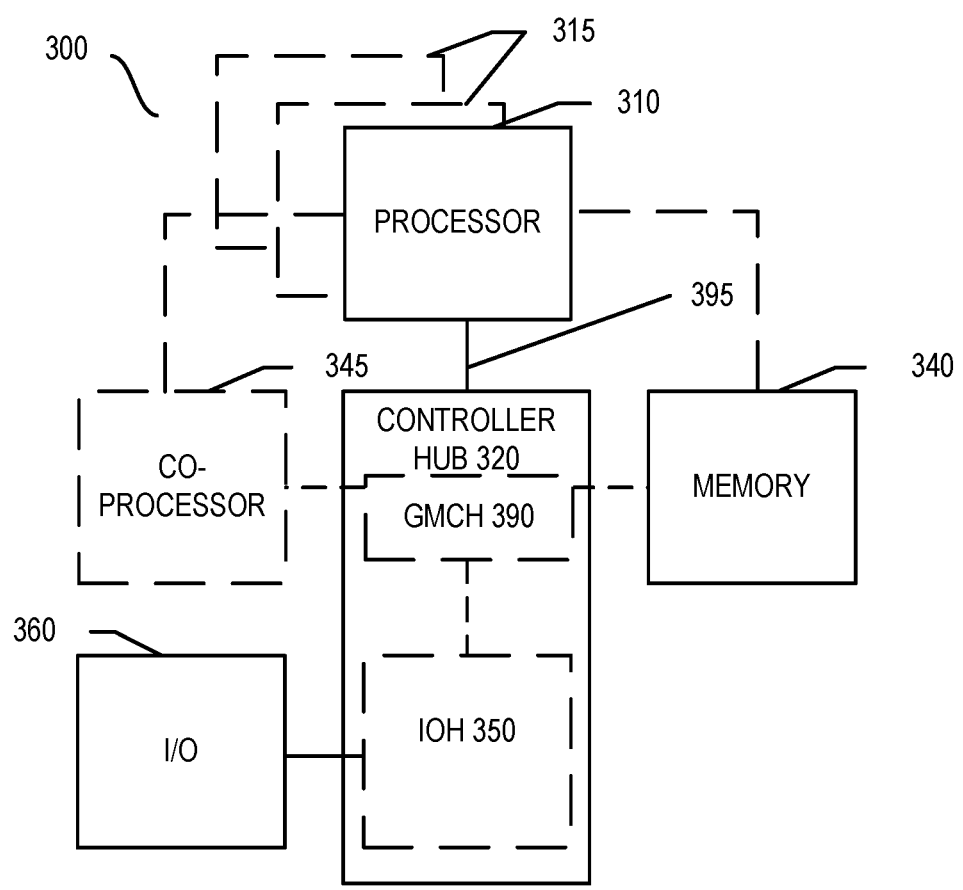
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
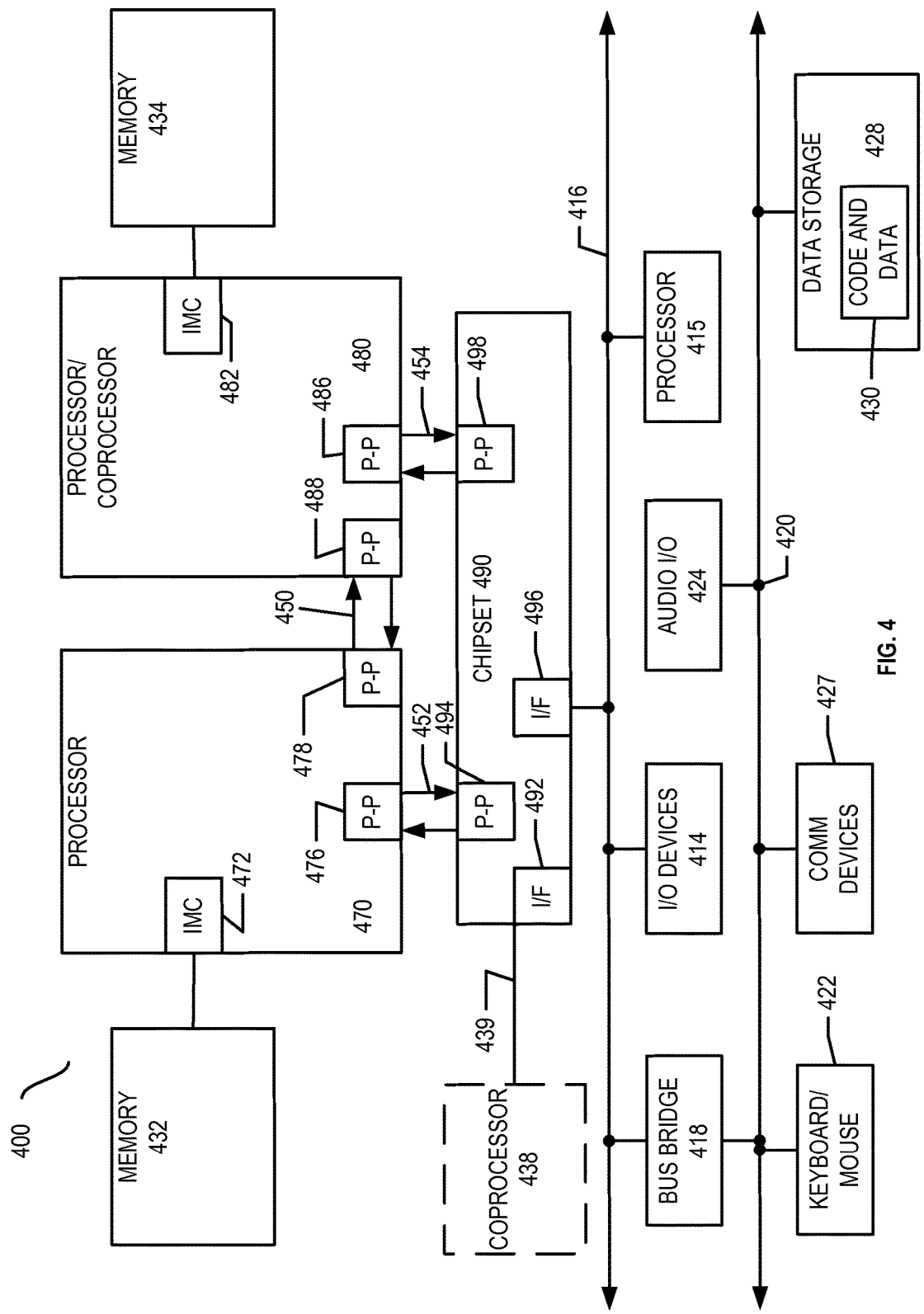
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
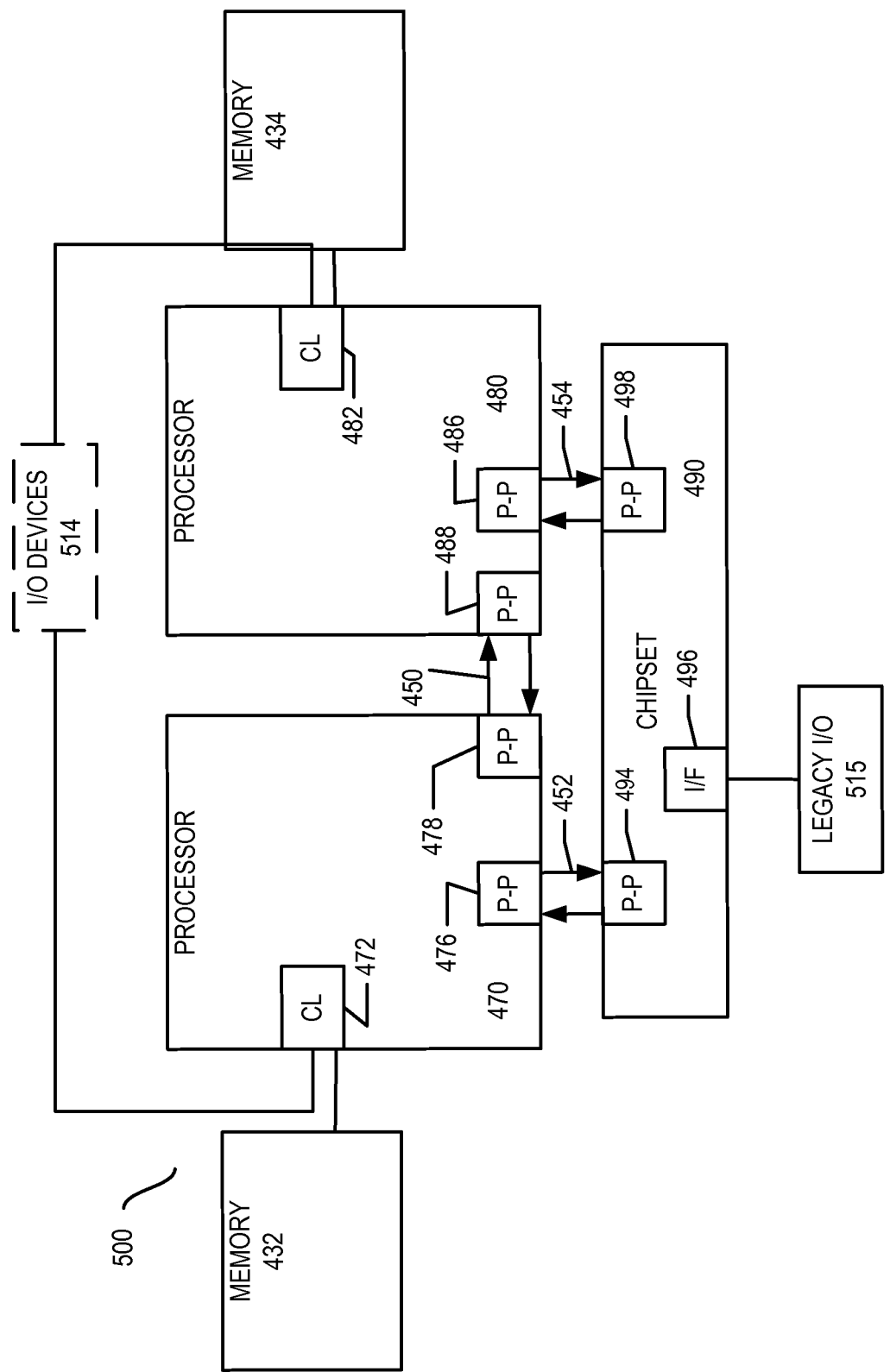
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
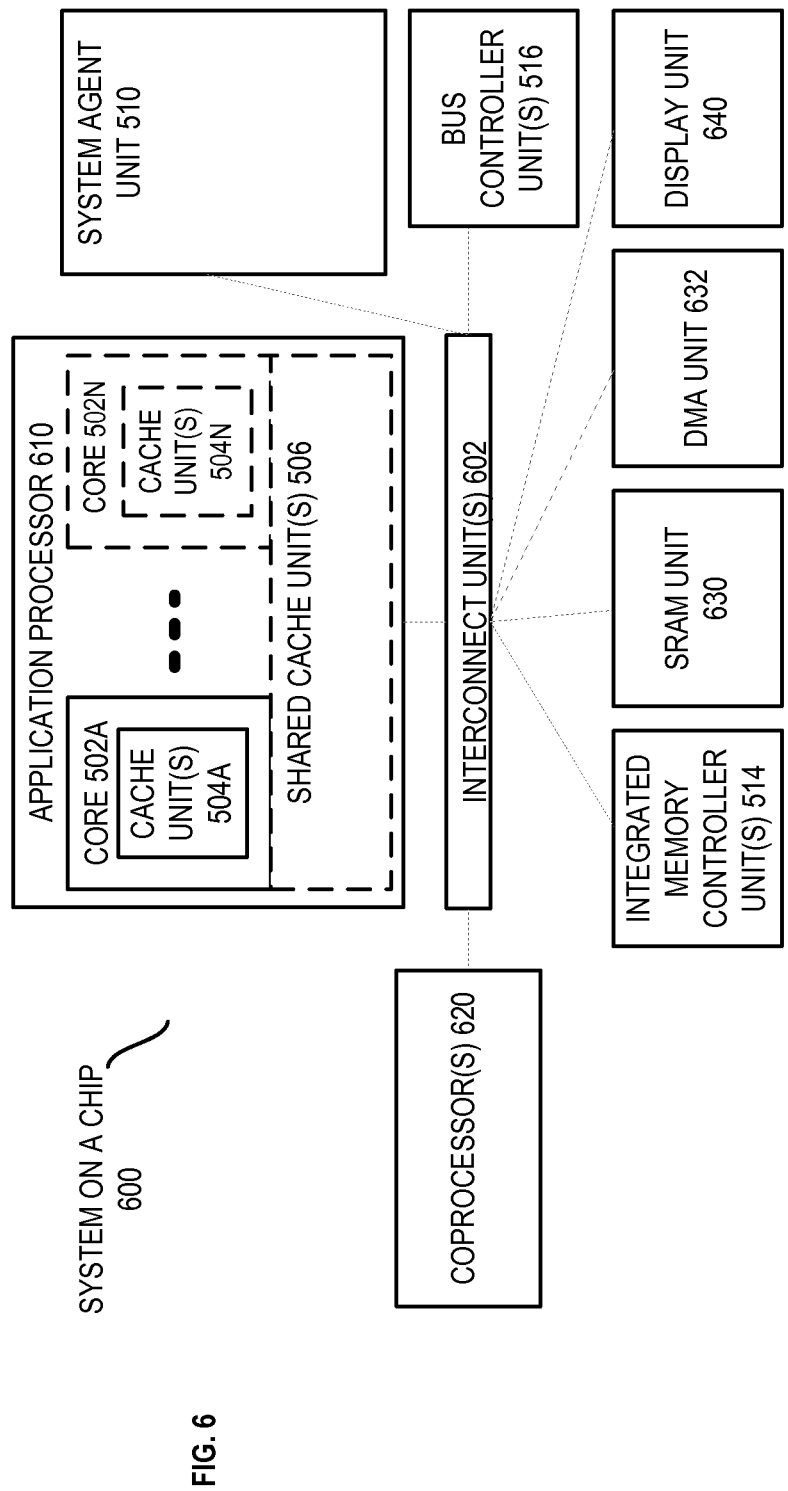
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
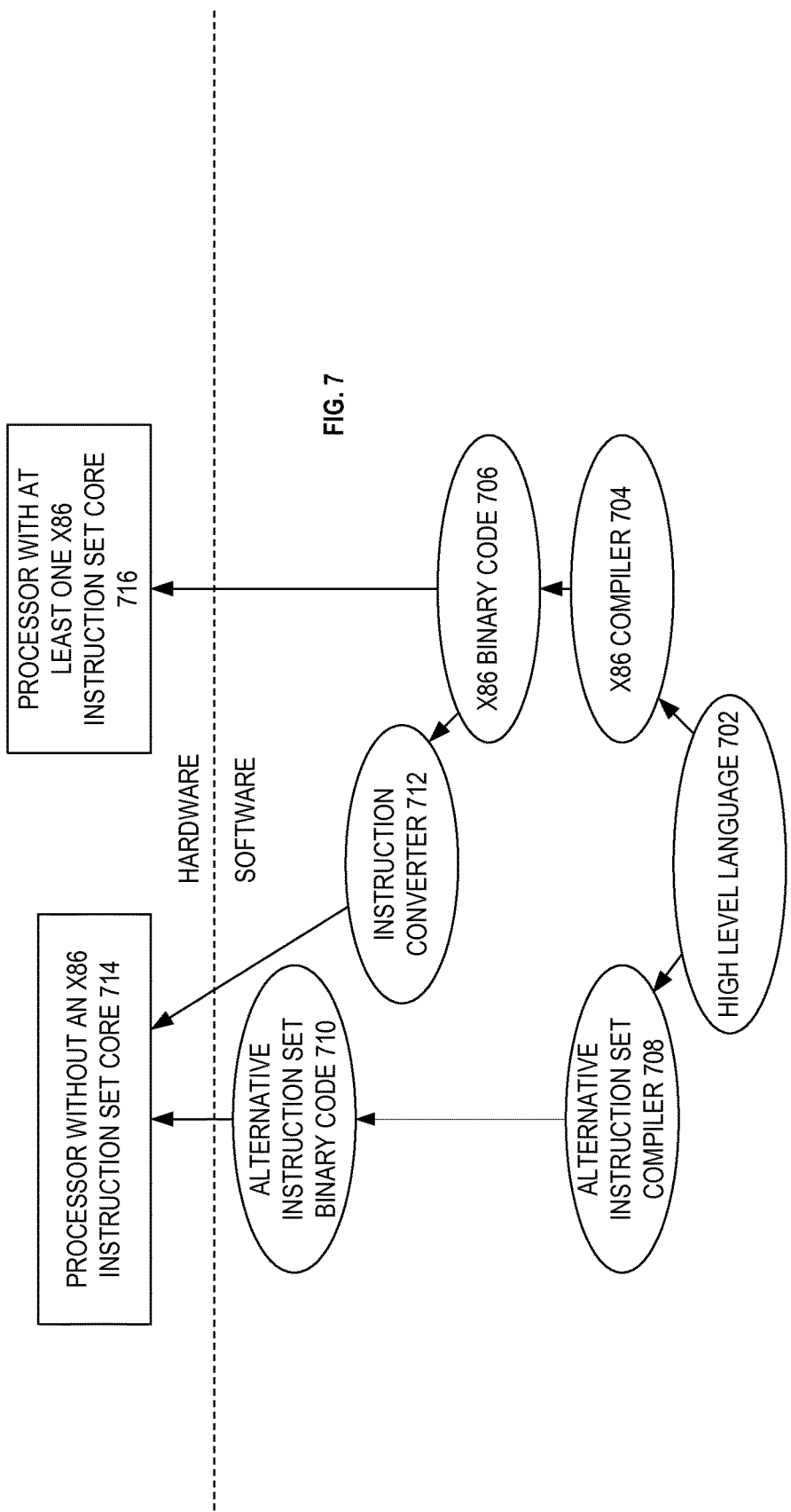
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Memory Renaming Using Virtual Registers

The embodiments of the invention include techniques to efficiently predict and mark load-store pairs for hardware memory renaming. As used herein, "memory renaming" is a technique in which store/load pairs directed to the same memory address are mapped to the same physical register. These techniques attempt to ensure that the data copied to a physical register by a store operation is available from the physical register by a subsequent load operation (as opposed to requiring the load operation to retrieve the same data from memory, which would significantly increase latency). One embodiment of the invention employs both memory rename (MRN) registers and virtual memory rename registers (VMRN) to track store/load mappings using components within a decode and/or execution stage of a processor. As discussed in detail below, for example, the memory renaming information may be attached to load/store uops arriving from decoders, from the uop cache, or directly from a uop queue within a loop stream detector (e.g., when in LSD mode).

Figure 8:
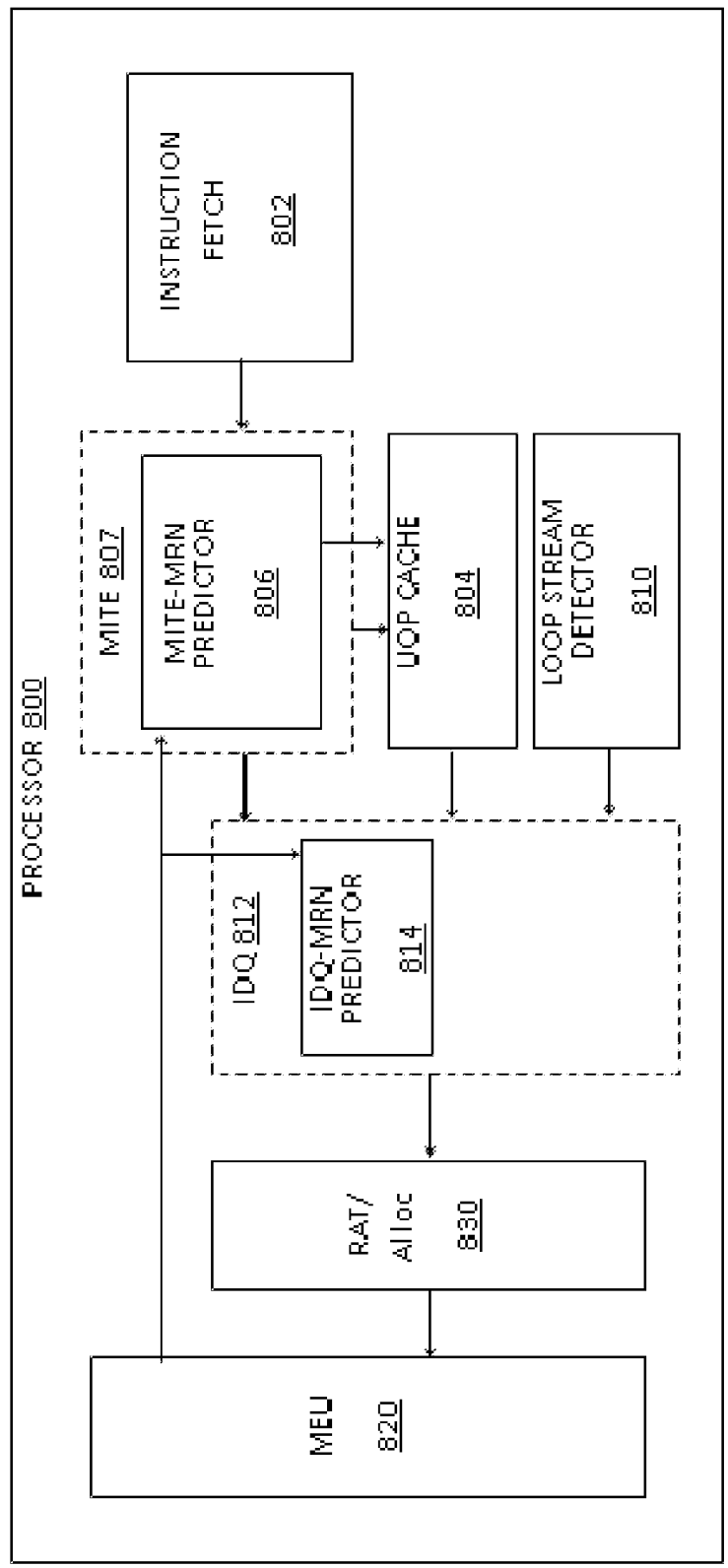
FIG. 8 illustrates pertinent elements of one embodiment of a processor architecture.

FIG. 8 illustrates an exemplary processor 800 on which embodiments of the invention may be implemented including a memory execution unit 820 for performing memory operations (e.g., loads/stores) and an instruction fetch unit 802 for fetching macroinstructions from memory. The instructions are decoded by decode logic within a macroinstruction translation engine (MITE) 807 which, in one embodiment, includes a MITE-MRN predictor 806 for performing memory renaming predictions as described herein. The illustrated embodiment also includes a uop cache 804 for caching decoded micro-operations (uops) according to a cache management policy and a loop steam detector (LSD) 810 configured to detect recurring loops within a program stream and responsively provide an indication of those loops to the IDQ 812 while they are executing. During this process, other portions of the processor may be temporarily powered down to conserve power (e.g., portions of the instruction fetch unit 802, uop cache 804, MITE 807, etc). In one embodiment, the IDQ 812 includes an IDQ-MRN predictor 814 which extends each IDQ entry to include memory renaming information used for implementing the techniques described herein (e.g., MRNi register and confidence counter as described below). In operation, the MITE 807 feeds the uop-cache 804 with uops, and the MITE-MRN predictor 806 updates specific fields in the uop-cache 804 with MRN data as described herein. In one embodiment, the LSD 810 is part of the branch processing unit (BPU) and provides "start" and "end" pointers to the IDQ 812, to indicate the loop body. Uops from the uop cache 804 and from the MITE 807 are provided to the IDQ 812, from there to the RAT/Alloc unit 830, and from there to the MEU 820.

Embodiments of the invention support memory renaming within loops played by the loop stream detector 810 and memory renaming for the uop cache 804. These embodiments save power on uop cache and loop stream detector hits, and reduce the number of false renamed loads as described below.

As mentioned, the MITE-MRN predictor 806 provides predictions on a uop cache 804 miss and the IDQ-MRN predictor 814 provides predictions during LSD loops managed by the LSD 810. As illustrated in FIG. 9, in one embodiment, the MITE-MRN predictor 806 is comprised of two tables—a load table 900 and a store table 910. Each entry in the load table 900 has a valid bit 901 to indicate whether the corresponding entry is valid, a MRNi register field 902 to identify a memory rename register, a VMRNi field 903 to identify a current virtual rename register, and a confidence counter field 904 containing a confidence counter value. Each entry in the store table 910 includes a valid bit 911 to indicate whether the entry is valid, a MRNi register field 911 to identify a memory rename register, and a VMRNi field 913 to identify a current virtual rename register.

While the embodiment shown in FIG. 8 includes both a MITE-MRN predictor 806 and an IDQ-MRN predictor 814, the underlying principles of the invention may be implemented using only one of these predictors (e.g., just the MITE-MRN predictor 806 or the IDQ-MRN predictor 814). Moreover, while illustrated in FIG. 8 as a separate logical unit, if a system has a uop cache 804, it may contain a copy of the MITE-MRN predictor 806 in itself.

As illustrated in FIG. 10, in one embodiment, the IDQ-MRN predictor 814 extends each IDQ entry with the following fields: a valid bit 1001, a MRNi register field 1002, and a confidence counter field 1003 for storing a confidence counter value.

In one embodiment, The MEU 820 sends three types of notifications to train the MITE-MRN predictor 806 and the IDQ-MRN predictor 814, which responsively update their respective tables: allocate store-load pair; promote a load; and demote a load. An Allocate event trains the predictors 806, 814 with a new store-load pair. In response, the predictor 806, 814 assigns a MRN register for the pair. In one embodiment, if the store already has an assigned MRN register (e.g., indicated within the store table 910) and the load does not, the MRN register identity is copied to the load (e.g., to the load table 900). If the load has an assigned MRN register and the store does not, the register is copied to the store. In one embodiment, the load's confidence counter is initially set to 0 for Allocate events.

In one embodiment, the MEU 820 notifies the predictors 806, 814 of each load for which verification has succeeded using a promote event (i.e., each load for which the stored data was successfully accessed from a MRN/VMRN register). In response to the Promote event, the predictors 806 and 814 increment their respective confidence counter values 904 and 1003, respectively. Thus, the confidence counter values provide an indication of the strength of the MRN/VMRN mapping. These confidence counter values may be used, for example, to determine whether to invalidate and/or replace entries in the load table 900 and/or IDQ-MRN predictor 814 table (e.g., invalidating/replacing entries with the lowest confidence counter values to make room for new entries). In one embodiment, the MEU 820 notifies the predictors 806, 814 of each load for which verification has failed using a Demote event (i.e., each load for which the stored data was not successfully accessed from a MRN/VMRN register). In one embodiment, the confidence counter is zeroed out in response to a Demote event.

In one embodiment, each μ-op in the uop cache 804 is augmented with memory renaming information including the MRNi register, VMRNi register, and a rename indication indicating a confidence counter value being above a specified threshold. The MITE-MRN predictor 806 transmits update notifications to the uop cache 806 in case of allocation, a Promote event which brings confidence above a specified threshold, and a Demote event described above.

In one embodiment, fetched stores and loads which miss in the uop-cache 804 look up the MITE-MRN predictor 806. In case of a hit, the MITE-MRN predictor 806 attaches to the store/load an MRNi register, VMRNi, and rename indication (i.e., confidence counter greater than a threshold). Fetched stores and loads which hit in the uop-cache 804, get the MRN information (e.g., MRNi register, VMRNi register, and rename indication) from the new fields in the uop-cache.

Figure 11D:
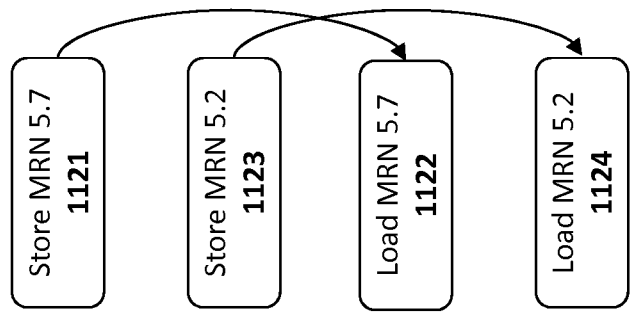
FIGS. 11A-D illustrates exemplary sequences of store and load operations used to illustrate features of one embodiment of the invention.
Figure 11C:
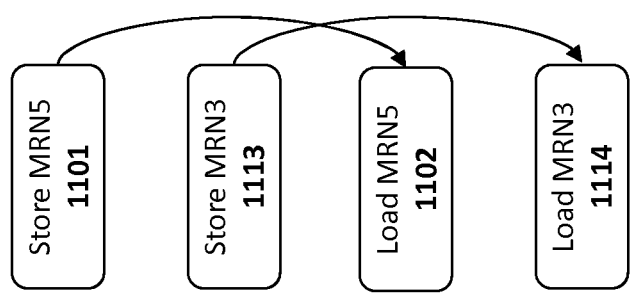

In one embodiment, fetched stores and loads which are provided directly from the instruction decode queue (IDQ) 812 receive the MRN information (MRNi register and rename indication) from IDQ-MRN predictor 814. With n MRNi registers, one out of n store-load pairs will use the same MRNi register. At lookup, loads and stores of different pairs, but of the same MRNi register, may arrive in proximity to each other as illustrated in FIGS. 11A-D. FIG. 11A illustrates an example in which the pairs do not interfere with each other. That is the store operation 1101 to MRN5 is followed by its corresponding load operation 1102 to MRN5. A new store operation 1103 to MRN5 followed by a corresponding load operation 1104 to MRN5. Because of the order in which the loads and stores are executed, memory renaming remains consistent.

Figure 11B:
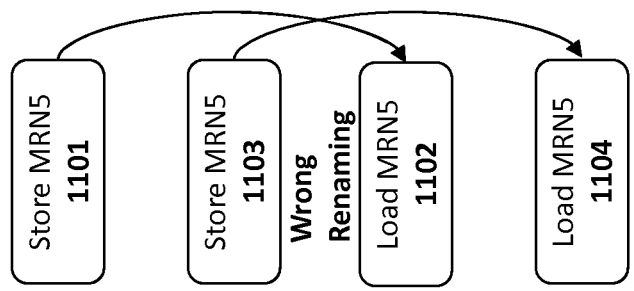
Figure 11A:
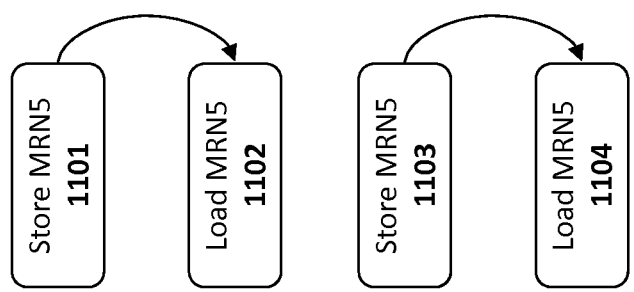

In contrast, if the store/load pairs are intertwined as shown in FIG. 11B, incorrect renaming may result. In particular, in this example, the two store operations 1101, 1103 are processed consecutively followed by the two load operations 1102, 1104, resulting in the data from store operation 1103 being stored in MRN5 just before load operation 1102 reads the data from MRN5. Load operation 1102 would then retrieve the wrong data from MRN5 if it is permitted to proceed. As a result of the incorrect renaming, the results must be nuked from the pipeline, resulting in a significant latency penalty.

As illustrated in FIG. 11C, using different MRN registers for different store/load pairs would solve this issue. For example, store operation 1101 and load operation 1102 in the illustrated example are allocated to MRN5 while store operation 1113 and load operation 1114 are allocated to MRN3. One problem with this implementation, however, is that registers allocated in the register allocation table (RAT) are expensive and there may not be a sufficient number of available registers to efficiently provide this functionality.

In one embodiment of the invention, virtual MRNi (VRMNi) registers are used to extend the number of MRNi registers to avoid the wrong renaming of FIG. 11B, and avoid the expensive, additional renaming shown in FIG. 11C. FIG. 11D illustrates an exemplary operation of this embodiment, where VRMNi registers 7 and 2 are mapped to MRN5 for different store/load pairs. In particular store operation 1121 is mapped to MRN 5.7 (i.e., VMRN7 is assigned to MRN5) and the next store operation 1123 is mapped to MRN 5.2 (i.e., VMRN2 is assigned to MRN5). When load operation 1122 is processed, MRN5 is assigned to VMRN2, so the value is retrieved from the memory hierarchy rather than from MRN5. However, because load operation 1124 is mapped to VRMN2, it is permitted to read the value from MRN5. Consequently, the pipeline does not need to be nuked as in the example in FIG. 11B and additional registers are not required as in the example in FIG. 11C.

Figure 12:
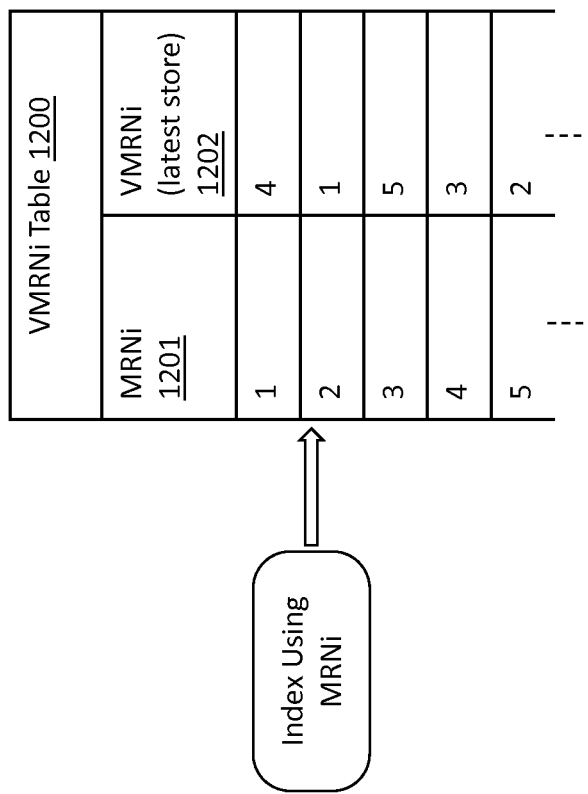
FIG. 12 illustrates a virtual memory rename table employed in one embodiment of the invention.

In one embodiment, when the MITE-MRN predictor 806 allocates an MRNi to a load/store operation, it also allocates a VMRNi register, using register renaming per the MRNi register. An n-entry VMRN table 1200 may be maintained such as shown in FIG. 12, which is indexed by the MRNi value. The entry n of the table 1200 holds the VRMNi of the latest store with MRNi=n (e.g., MRN=5 in the example, indexes to VMRN=2). In one embodiment, for each Store being written to the IDQ 812:

---

Set VMRNi_table[st.MRNi] = st.VRMNi;
For each Load being written to the IDQ:
    If (none of the store in current cycle has st.MRNi == Id.MRNi)
        Latest_store_VRMNi = VMRNi_table[Id.MRNi];

```
Else
    Latest_store_VRMNi = VRMNi of latest store with
    st.MRNi == Id.MRNi;
    If (Id.VMRNi ≠ latest_store_VRMNi) then Id.rename = 0;
```

As mentioned, FIG. 11D illustrates this operation. The first store 1121 sets VMRNi_table[5]=5.7. The second store 1123 then sets VMRNi_table[5]=5.2. The first load 1122, which is paired with the first store (i.e., has VMRNi=5.7) reads VMRNi_table[5] and gets 5.2. This means it cannot use the value in MRN5, and its renaming is cancelled, avoiding a nuke. The second load 1124, which is paired with the second store 1123 (has VMRNi=5.2) reads VMRNi_table[5] and gets 5.2, so it is dynamically renamed.

Figure 13:
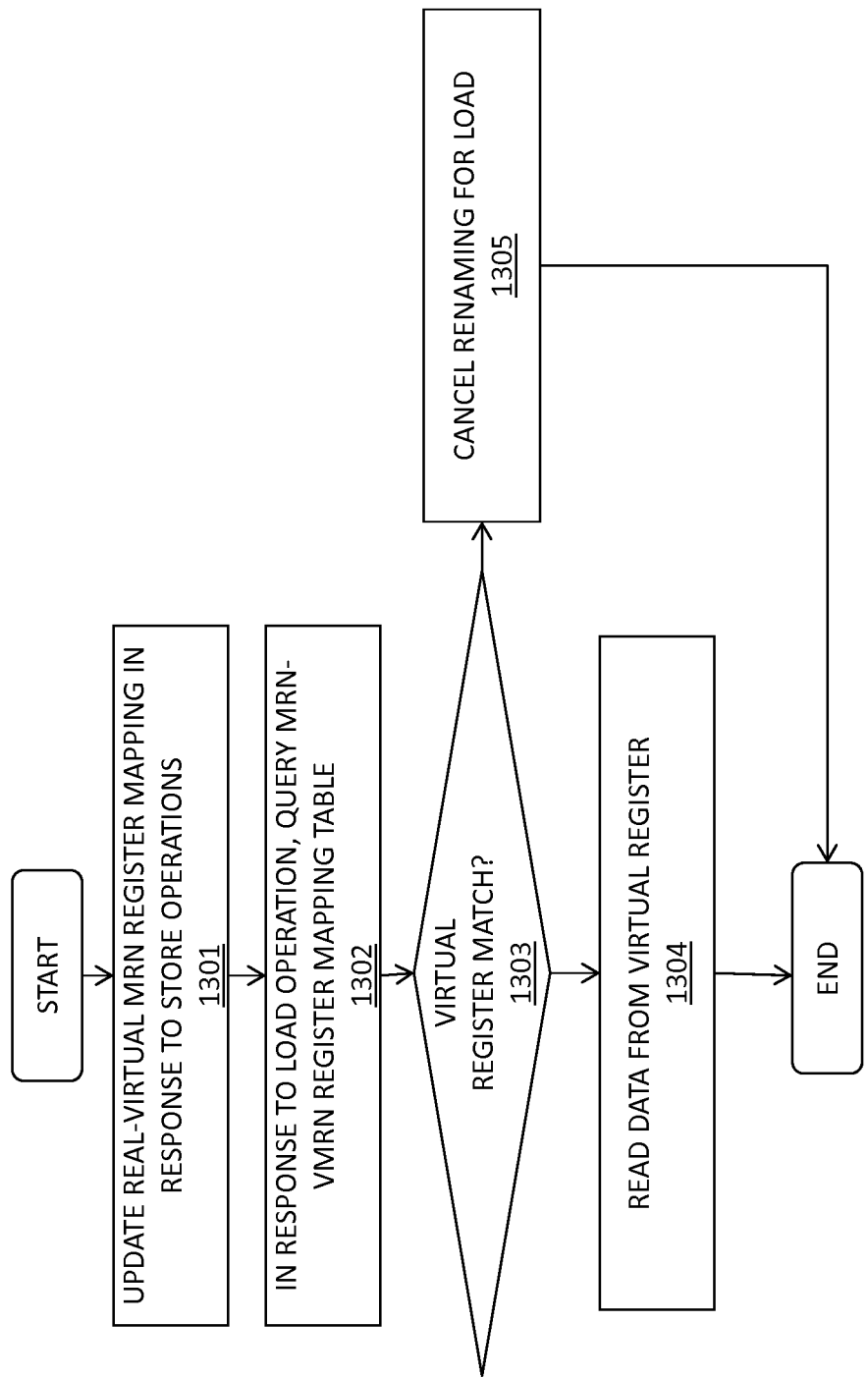
FIG. 13 illustrates a method in accordance with one embodiment of the invention.

A method in accordance with one embodiment of the invention is illustrated in FIG. 13. At 1301, real-virtual memory rename register mappings are updated in response to store operations. As mentioned, a table may be used to record an association between each memory rename register and a virtual memory rename (VMRN) register assigned to each store operation. At 1302, a load operation is received and, in response, the MRN-VMRN table is queried. In one embodiment, the MRN value used for the load operation is used as an index to the table. The current VMRN register is determined from the table and, if it matches the VMRN register associated with the latest store operation, determined at 1303, then at 1304, the load operation is allowed to be renamed. This mechanism is a filter that either cancels or allows the renaming of the load through the MRN based on the virtual VMRN. If the load operation is not allowed to be renamed, then memory renaming is cancelled for the load operation at 1305.

The embodiments of the invention described above provide numerous benefits over prior implementations. As mentioned, virtual MRN registers are used to extend the number of MRNi registers to avoid incorrect renaming (which would result in significant additional latency). Moreover, the embodiments of the invention may be implemented without additional MRN registers, resulting in a simplified design and lower power consumption.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
    a memory execution unit (MEU) to perform store and load operations to store data to memory and load data from memory, respectively;
    a plurality of memory rename (MRN) registers assigned to store and load operations, each MRN register to store data associated with a store operation so that the data is available for a subsequent load operation; and
    at least one MRN predictor comprising a data structure to allocate virtual memory rename (VMRN) registers to each of the MRN registers, the MRN predictor to query the data structure in response to a load and/or store operation using a value identifying the MRN register assigned to the load and/or store operation, respectively, to determine a current VMRN register associated with the load and/or store operation.

2. The apparatus as in claim 1 wherein the data structure comprises a table with a different entry for each MRN register, each entry in the table associating its MRN register with a VMRN register.

3. The apparatus as in claim 2 further comprising:
    a macroinstruction translation engine (MITE) comprising decode logic to decode macroinstructions into a plurality of microoperations (uops) including store and load uops,
    wherein the at least one MRN predictor includes a MITE-MRN predictor comprising the table to associate an MRN register assigned to a store and/or load uop with a VMRN register.

4. The apparatus as in claim 3 further comprising:
    a uop cache to cache uops prior to execution in accordance with a cache management policy, the MITE-MRN predictor to update store uop and/or load uop entries in the uop cache with memory renaming information including a current MRN register and current VMRN register associated with the MRN register.

5. The apparatus as in claim 4 further comprising:
a loop stream detector (LSD) communicatively coupled to an instruction decode queue (IDQ) to queue store and/or load uops prior to execution, the LSD to detect loops in program code and execute uops associated with the loops from the IDQ, wherein the IDQ further comprises an IDQ-MRN predictor comprising a data structure to extend entries in the IDQ to include mappings of MRN registers with VMRN registers associated store and/or load uops.

6. The apparatus as in claim 5 wherein in response to an allocate event from the MEU the MITE-MRN predictor is to associate a new VMRN register with an MRN register within the table and/or the IDQ-MRN predictor is to associate a new VMRN with an MRN register within its data structure for store and/or load uops stored within the IDQ.

7. The apparatus as in claim 6 further comprising:
a state machine associated with the table and/or the data structure, the state machine to be placed in a more confident state in response to a promote event received from the MEU, the MEU to generate the promote event for each load for which data is successfully read from an MRN register associated with the load.

8. The apparatus as in claim 7 wherein the state machine comprises a confidence counter value maintained within the table and/or the data structure, the confidence counter value to be incremented in response to a promote event received from the MEU, the MEU to generate the promote event for each load for which data is successfully read from an MRN register associated with the load.

9. The apparatus as in claim 7 wherein the state machine is configured to be placed in a less confident state in response to detecting a load for which correct data was not available in a corresponding MRN register.

10. The apparatus as in claim 9 wherein the state machine comprises a and wherein a confidence counter value is to be decremented or set to 0 in response to detecting a load for which correct data was not available in a corresponding MRN register.

11. The method as in claim 8 wherein the MITE-MRN predictor is to set a rename indication in the uop cache in response to a confidence counter value above a specified threshold.

12. The apparatus as in claim 11 wherein fetched stores and loads which hit in the uop-cache receive an indication of the MRN register, VMRN register, and rename indication from the uop-cache.

13. The apparatus as in claim 12 wherein fetched stores and loads which miss in the uop-cache look up the MITE-MRN predictor and, in case of a hit, the MITE-MRN predictor attaches to the store/load an MRN register, VMRN register, and rename indication if the confidence counter greater than a threshold.

14. A method comprising:
performing store and load operations in a memory execution unit (MEU) to store data to memory and load data from memory, respectively;
assigning a plurality of memory rename (MRN) registers to the store and load operations, each MRN register to store data associated with a store operation so that the data is available for a subsequent load operation; and
allocating virtual memory rename (VMRN) registers to each of the MRN registers with at least one MRN predictor comprising a data structure, the MRN predictor to query the data structure in response to a load and/or store operation using a value identifying the MRN register assigned to the load and/or store operation, respectively; to determine a current VMRN register associated with the load and/or store operation.

15. The method as in claim 12 wherein the data structure comprises a table with a different entry for each MRN register, each entry in the table associating its MRN register with a VMRN register.

16. The method as in claim 13 further comprising:
decoding macroinstructions with decode logic in a macroinstruction translation engine (MITE), the macroinstructions decoded into a plurality of microoperations (uops) including store and load uops,
wherein at least one MRN predictor includes a MITE-MRN predictor comprising the table to associate an MRN register assigned to a store and/or load uop with a VMRN register.

17. The method as in claim 14 further comprising:
caching uops in a uop cache prior to execution in accordance with a cache management policy, the MITE-MRN predictor to update store uop and/or load uop entries in the uop cache with memory renaming information including a current MRN register and current VMRN register associated with the MRN register.

18. The method as in claim 17 further comprising:
queuing store and/or load uops prior to execution in an instruction decode queue (IDQ) communicatively coupled to a loop stream detector (LSD), the LSD to detect loops in program code and execute uops associated with the loops from the IDQ, wherein the IDQ further comprises an IDQ-MRN predictor comprising a data structure to extend entries in the IDQ to include mappings of MRN registers with VMRN registers associated store and/or load uops.

19. The method as in claim 18 wherein in response to an allocate event from the MEU the MITE-MRN predictor is to associate a new VMRN register with an MRN register within the table and/or the IDQ-MRN predictor is to associate a new VMRN with an MRN register within its data structure for store and/or load uops stored within the IDQ.

20. The method as in claim 19 further comprising:
implementing a state machine associated with the table and/or the data structure, the state machine to be placed in a more confident state in response to a promote event received from the MEU, the MEU to generate the promote event for each load for which data is successfully read from an MRN register associated with the load.

21. The method as in claim 20 wherein the state machine comprises a confidence counter value maintained within the table and/or the data structure, the confidence counter value to be incremented in response to a promote event received from the MEU, the MEU to generate the promote event for each load for which data is successfully read from an MRN register associated with the load.

22. The method as in claim 20 wherein the state machine is configured to be placed in a less confident state in response to detecting a load for which correct data was not available in a corresponding MRN register.

23. The method as in claim 22 wherein the state machine comprises a and wherein a confidence counter value is to be decremented or set to 0 in response to detecting a load for which correct data was not available in a corresponding MRN register.

24. The method as in claim 21 wherein the MITE-MRN predictor is to set a rename indication in the uop cache in response to a confidence counter value above a specified threshold.

25. The method as in claim 24 wherein fetched stores and loads which hit in the uop-cache receive an indication of the MRN register, VMRN register, and rename indication from the uop-cache.

26. The method as in claim 25 wherein fetched stores and loads which miss in the uop-cache look up the MITE-MRN predictor and, in case of a hit, the MITE-MRN predictor attaches to the store/load an MRN register, VMRN register, and rename indication if the confidence counter greater than a threshold.

* * * * *